United States Patent
Okumura et al.

(10) Patent No.: US 11,020,936 B2
(45) Date of Patent: Jun. 1, 2021

(54) METAL/RESIN COMPOSITE STRUCTURE

(71) Applicant: MITSUI CHEMICALS, INC., Tokyo (JP)

(72) Inventors: Hiroshi Okumura, Ichihara (JP); Masaki Misumi, Yokohama (JP); Shunsaku Kubota, Kishiwada (JP); Goro Inoue, Sodegaura (JP)

(73) Assignee: MITSUI CHEMICALS, INC., Tokyo (JP)

( * ) Notice: Subject to any disclaimer, the term of this patent is extended or adjusted under 35 U.S.C. 154(b) by 482 days.

(21) Appl. No.: 15/021,650

(22) PCT Filed: Sep. 12, 2014

(86) PCT No.: PCT/JP2014/074287
§ 371 (c)(1),
(2) Date: Mar. 11, 2016

(87) PCT Pub. No.: WO2015/037718
PCT Pub. Date: Mar. 19, 2015

(65) Prior Publication Data
US 2016/0221301 A1    Aug. 4, 2016

(30) Foreign Application Priority Data
Sep. 13, 2013    (JP) .............................. JP2013-190607

(51) Int. Cl.
*B32B 7/04*    (2019.01)
*B32B 15/085*    (2006.01)
(Continued)

(52) U.S. Cl.
CPC .................. *B32B 7/04* (2013.01); *B24C 1/00* (2013.01); *B29C 45/14311* (2013.01);
(Continued)

(58) Field of Classification Search
CPC ......... B32B 3/263; B32B 15/085; B32B 7/04; B32B 27/32; B32B 2250/02
See application file for complete search history.

(56) References Cited

U.S. PATENT DOCUMENTS

| | | |
|---|---|---|
| 7,640,646 B2 | 1/2010 | Naritomi |
| 7,841,577 B2 | 11/2010 | Yamaguchi |

(Continued)

FOREIGN PATENT DOCUMENTS

| | | |
|---|---|---|
| CN | 101568420 A | 10/2009 |
| CN | 101578170 A | 11/2009 |

(Continued)

OTHER PUBLICATIONS

Gao et al, "Enhancement mechanism of super fine machining pattern on mechanical property of adhesin interface of Al alloy," Oct. 2012, ScienceDirect—Physics Procedia, Issue 50, pp. 288-292 (Year: 2012).*

(Continued)

*Primary Examiner* — Maria V Ewald
*Assistant Examiner* — Ethan Weydemeyer
(74) *Attorney, Agent, or Firm* — Rankin, Hill & Clark LLP (57) ABSTRACT

A metal/resin composite structure (106) of the invention is formed by bonding a metal member (103) and a resin member (105) to each other.
A concavo-convex shape satisfying the following characteristics (i) and (ii) is formed on a bonding surface (104) of the metal member (103) to be bonded to the resin member (105).
(i) A mean width of the profile elements (RSm) is equal to or greater than 150 μm and equal to or smaller than 1500 μm and a maximum height roughness (Rz) is equal to or greater than 170 μm and equal to or smaller than 800 μm (Continued)

(ii) A mean width of the profile elements (RSm) is equal to or greater than 100 nm and equal to or smaller than 10000 nm and a maximum height roughness (Rz) is equal to or greater than 100 nm and equal to or smaller than 10000 nm.

3 Claims, 4 Drawing Sheets

(51) Int. Cl.
    *B32B 27/32*     (2006.01)
    *B32B 3/26*     (2006.01)
    *B24C 1/00*     (2006.01)
    *C08J 5/12*     (2006.01)
    *B29C 45/14*     (2006.01)
    *B29K 23/00*     (2006.01)

(52) U.S. Cl.
    CPC .......... *B32B 3/263* (2013.01); *B32B 15/085* (2013.01); *B32B 27/32* (2013.01); *C08J 5/12* (2013.01); *B29K 2023/00* (2013.01); *B32B 2250/02* (2013.01)

(56) References Cited

U.S. PATENT DOCUMENTS

| | | | |
|---|---|---|---|
| 7,919,032 | B2 | 4/2011 | Yamaguchi |
| 8,367,210 | B2 | 2/2013 | Naritomi |
| 2004/0062943 | A1 | 4/2004 | Naritomi |
| 2006/0055084 | A1 | 3/2006 | Yamaguchi |
| 2006/0127684 | A1 | 6/2006 | Naritomi |
| 2008/0127479 | A1 | 6/2008 | Takahashi |
| 2010/0028602 | A1 | 2/2010 | Naritomi |
| 2010/0112287 | A1* | 5/2010 | Naritomi ............ B32B 7/12 428/143 |
| 2010/0304083 | A1 | 12/2010 | Naritomi |
| 2010/0304171 | A1* | 12/2010 | Tomantschger ......... C08J 7/123 428/548 |
| 2011/0008644 | A1 | 1/2011 | Andoh |
| 2011/0031648 | A1 | 2/2011 | Yamaguchi |
| 2012/0207982 | A1 | 8/2012 | Aso |

FOREIGN PATENT DOCUMENTS

| | | |
|---|---|---|
| JP | 2002003805 A2 | 1/2002 |
| JP | 2004216425 A2 | 8/2004 |
| JP | 2004216609 A2 | 8/2004 |
| JP | 2006213991 A2 | 8/2006 |
| JP | 2009006721 A2 | 1/2009 |
| JP | 2009298144 A2 | 12/2009 |
| JP | 2013052671 A2 | 3/2013 |
| JP | 2014-51041 | 3/2014 |
| WO | 2003064150 A1 | 8/2003 |
| WO | 2004055248 A1 | 7/2004 |
| WO | 2009031632 A1 | 3/2009 |
| WO | 2009078373 A1 | 6/2009 |

OTHER PUBLICATIONS

Japanese Office Action dated Oct. 18, 2016 issued in the corresponding Japanese patent application No. 2015-536650.
Chinese Office Action dated Nov. 28, 2016 for corresponding Chinese Patent Application No. 201480049459.9.
International Search Report dated Dec. 16, 2014 filed in PCT/JP2014/074287.
Extended European Search Report dated May 4, 2017 issued in the corresponding European patent application No. 14843821.1.

* cited by examiner

METAL/RESIN COMPOSITE STRUCTURE

TECHNICAL FIELD

The present invention relates to a metal/resin composite structure.

BACKGROUND ART

Resins are used as a substitute for metals from a viewpoint of light weight of various components. However, all metal components may be difficult to be substituted with resins. In such a case, a metal molded body and a resin molded body may be bonded and integrated so as to manufacture a new composite component. However, a technology of bonding and integrating a metal molded body and a resin molded body at high bonding strength by an industrially advantageous method has not implemented yet.

In recent years, as a technology of bonding and integrating a metal molded body and a resin molded body, a technology of bonding engineering plastics including a polar group having affinity with a metal member, to a surface of the metal member where fine concavities and convexities are formed has been proposed (for example, Patent Documents 1 to 5).

For example, Patent Documents 1 to 3 disclose a technology of performing a dipping treatment with respect to an aluminum alloy in an aqueous hydrazine solution, forming concave portions having a diameter of 30 nm to 300 nm on the surface thereof, and bonding a polybutylene terephthalate resin (hereinafter, referred to as "PBT") or a polyphenylene sulfide resin (hereinafter, referred to as "PPS") to the surface subjected to the treatment.

Patent Document 4 discloses a technology of performing an anodic oxidation treatment with respect to an aluminum material using an electrolytic bath of phosphoric acid or sodium hydroxide, forming an anodized coating film having concave portions having a diameter equal to or greater than 25 nm on the surface of the aluminum material, and bonding engineering plastics to the surface subjected to the treatment.

Patent Document 5 discloses a technology of forming fine concavities and convexities or holes in an aluminum alloy with a specific etching agent and injecting a polyamide 6 resin, a polyamide 6 resin, and PPS to the holes for bonding.

In recent years, a metal/resin composite structure in which metals and engineering plastics are bonded to each other has been obtained by the technologies described above. However, when realizing the technologies, higher bonding strength is required between metals and resins.

In Patent Documents 1 to 5, engineering plastics including a polar group are used as resin members. Meanwhile, in a case of applying the technologies described above regarding a non-polar polyolefin resin not having affinity with a metal member, an acid-modified polyolefin resin in which a polar group is introduced to a polyolefin resin may be used (Patent Document 6).

However, in order to bond the resin described above and a metal member, it is necessary that the resin is maintained in a melted state and the resin and the metal member come into contact with each other at high pressure for a long time, and in general, the bonding is performed by a laminating method or a pressing method by melt extrusion. However, in a case of the laminating method or the pressing method, a degree of freedom of an applicable shape is low. In addition, the acid-modified polyolefin resin attaches to portions other than a desired portion for bonding, and accordingly, performance or appearance of a metal member may not be exhibited depending on a shape of a component.

RELATED DOCUMENTS

Patent Documents

[Patent Document 1] Japanese Unexamined Patent Publication No. 2004-216425

[Patent Document 2] Japanese Unexamined Patent Publication No. 2009-6721

[Patent Document 3] Pamphlet of International Publication No. WO2003/064150

[Patent Document 4] Pamphlet of International Publication No. WO2004/055248

[Patent Document 5] Japanese Unexamined Patent Publication No. 2013-52671

[Patent Document 6] Japanese Unexamined Patent Publication No. 2002-3805

SUMMARY OF THE INVENTION

The invention is made in consideration of these circumstances and an object thereof is to provide a metal/resin composite structure in which a metal member and a resin member can be directly bond to each other and bonding strength between the metal member and the resin member is excellent.

The inventors have performed various studies regarding a technology, represented by technologies disclosed in Patent Documents 1 to 5, of directly bonding a resin member formed of a resin composition including a non-polar resin which is represented by a polyolefin resin and does not have affinity with a metal member, to a metal member having a metal surface subjected to a roughening treatment. However, even when the metal member subjected to a roughening treatment and a resin member formed of a non-polar resin are bonded to each other, bonding strength is low, and accordingly, an interface between the metal member and the resin member is separated and it is difficult to form a composite structure having high bonding strength.

Accordingly, the invention particularly provides a metal/resin composite structure in which a resin member and a metal member can be directly bonded to each other without receiving an effect of denaturation of the resin and has excellent bonding strength between the metal member and the resin member, even in a case of using a resin composition containing a non-polar resin which is represented by a polyolefin resin and does not have affinity with the metal member, as the resin member.

The inventors have performed research in order to solve the above-mentioned problems. As a result, the inventors have found that a metal/resin composite structure having excellent bonding strength between a resin member and a metal member is obtained by directly bonding a metal member having a concavo-convex shape having two or more different types of characteristics and a resin member to each other, and the invention has been completed.

That is, the invention relates to the following [1] to [7].

[1] A metal/resin composite structure, in which the metal/resin composite structure is formed by bonding a metal member and a resin member to each other, and a concavo-convex shape satisfying the following characteristics (i) and (ii) is formed on a bonding surface of the metal member to be bonded to the resin member.

(i) A mean width of the profile elements (RSm) is equal to or greater than 150 μm and equal to or less than 1500 μm and a maximum height roughness (Rz) is equal to or greater than 170 μm and equal to or smaller than 800 μm (ii) A mean width of the profile elements (RSm) is equal to or greater than 100 nm and equal to or smaller than 10000 nm and a maximum height roughness (Rz) is equal to or greater than 100 nm and equal to or smaller than 10000 nm

[2] The metal/resin composite structure according to [1], in which an ultrafine concavo-convex shape having a diameter equal to or greater than 5 nm and equal to or smaller than 100 nm and a depth equal to or greater than 10 nm and equal to or smaller than 500 nm is formed on the surface of the metal member.

[3] The metal/resin composite structure according to [1] or [2], in which the concavo-convex shape satisfying characteristics (ii) is formed on the concavo-convex shape satisfying characteristics (i).

[4] The metal/resin composite structure according to any one of [1] to [3], in which the metal member is formed of a metal material containing one kind or two or more kinds of metal selected from iron, stainless steel, aluminum, an aluminum alloy, magnesium, a magnesium alloy, copper, a copper alloy, titanium, and a titanium alloy.

[5] The metal/resin composite structure according to any one of [1] to [4], in which the resin member is formed of a resin composition containing an (A) thermoplastic resin.

[6] The metal/resin composite structure according to [5], in which the (A) thermoplastic resin is a polyolefin resin.

[7] The metal/resin composite structure according to [5] or [6], in which the resin composition contains a (B) filling material and the content of the (B) filling material is equal to or greater than 1 part by mass and equal to or smaller than 100 parts by mass with respect to 100 parts by mass of the (A) thermoplastic resin.

[8] The metal/resin composite structure according to [2], in which the concavo-convex shape satisfying the characteristics (i) is formed on the surface of the metal member by performing a blast treatment with respect to the metal member, the concavo-convex shape satisfying the characteristics (ii) is further formed on the surface of the metal member by performing a chemical etching method of dipping the metal member in at least one kind of an aqueous solution selected from an aqueous solution of an inorganic base and an aqueous solution of an inorganic acid, and the ultrafine concavo-convex shape is further formed on the surface of the metal member by dipping the metal member in an aqueous solution containing one or more kinds selected from hydrazine hydrate, ammonia, and a water-soluble amine compound.

According to the invention, it is possible to obtain a metal/resin composite structure having excellent bonding strength between a metal member and a resin member.

Particularly, in the invention, it is possible to obtain a metal/resin composite structure in which the metal member and the resin member are bonded to each other with high strength, even in a case where the resin member is formed of a resin composition containing a non-polar resin which is represented by a polyolefin resin and does not have affinity with the metal member. This technology was difficult to obtain in the technologies of the related art.

BRIEF DESCRIPTION OF THE DRAWINGS

The above-described object and other objects, features, and advantages will become more apparent by preferred embodiments described below and the following accompanying drawings.

DESCRIPTION OF EMBODIMENTS

Hereinafter, embodiments of the invention will be described with reference to the drawings. In all drawings, the same reference numerals are used for the same constituent elements and the description thereof will not be repeated. A term "to" between numbers in this document means an expression "equal to or more than a number and equal to or less than a number", if not otherwise specified.

Figure 1:
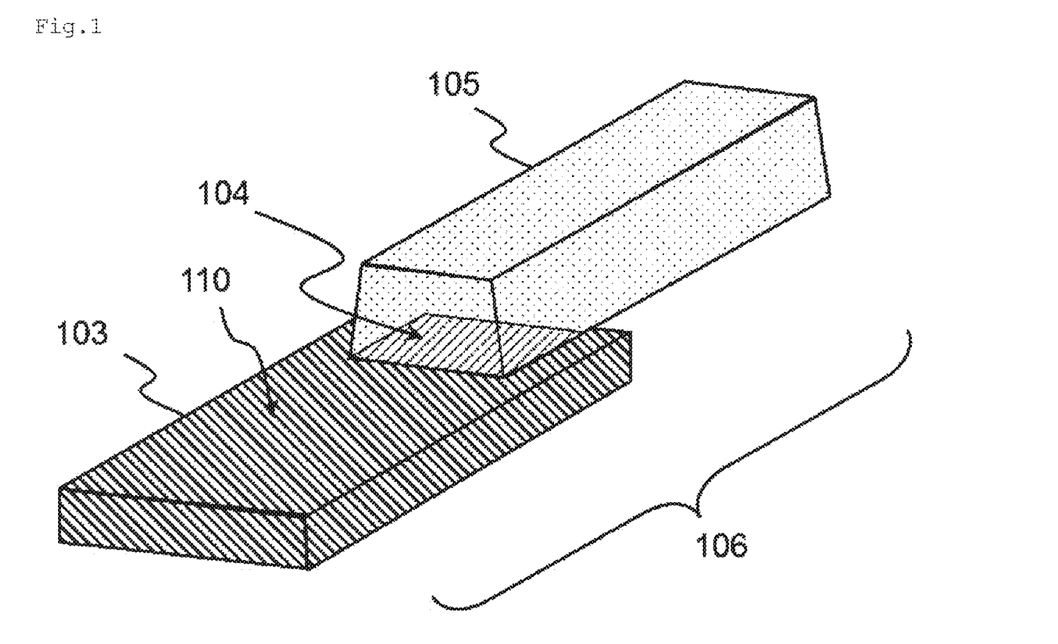
FIG. 1 is an outline view schematically showing an example of a structure of a metal/resin composite structure according to an embodiment.

FIG. 1 is an outline view schematically showing an example of a structure of a metal/resin composite structure 106 according to the embodiment.

A metal member 103 and a resin member 105 are bonded to each other in the metal/resin composite structure 106 and the metal/resin composite structure 106 is obtained by bonding the metal member 103 and the resin member 105 to each other.

A bonding surface 104 of the metal member 103 to be bonded to the resin member 105 has a concavo-convex shape satisfying characteristics (i) and (ii) described below.

(i) A mean width of the profile elements (RSm) is equal to or greater than 150 μm and equal to or smaller than 1500 μm and a maximum height roughness (Rz) is equal to or greater than 170 μm and equal to or smaller than 800 μm.

(ii) A mean width of the profile elements (RSm) is equal to or greater than 100 nm and equal to or smaller than 10000 nm and a maximum height roughness (Rz) is equal to or greater than 100 nm and equal to or smaller than 10000 nm.

Hereinafter, each constituent element configuring the metal/resin composite structure 106 according to the embodiment and a preparing method thereof, and features of the metal/resin composite structure 106 will be described.

<Metal Member>
[Kind of Metal of Metal Member]

In the embodiment, as kind of metal configuring the metal member 103, a metal material containing one kind or two or more kinds selected from iron, stainless steel, aluminum, an aluminum alloy, magnesium, a magnesium alloy, copper, a copper alloy, titanium, and a titanium alloy is desirable. Among these, iron, stainless steel, an aluminum alloy, a magnesium alloy, a copper alloy, and a titanium alloy are preferable and stainless steel, an aluminum alloy, a magnesium alloy, and a copper alloy are more preferable as kinds of metals configuring the metal member 103.

Among these, aluminum (simple substance of aluminum) and an aluminum alloy are preferable and an aluminum alloy is more preferable, from a viewpoint of light weight and high strength.

As an aluminum alloy, alloy numbers 1050, 1100, 2014, 2024, 3003, 5052, and 7075 based on JIS H4000 are preferably used.

The shape of the metal member 103 is not particularly limited as long as it is a shape which can be bonded to the resin member 105, and a flat plate shape, a curved plate shape, a stick shape, a tubular shape, or a lump shape can be used, for example. The metal member may be a structure formed of a combination of the shapes described above.

The shape of a bonding surface 104 to be bonded to the resin member 105 is not particularly limited and may be a flat surface or a curved surface.

[Surface Shape of Metal Member]

The metal member 103 configuring the metal/resin composite structure 106 according to the embodiment has a concavo-convex shape having two or more different types of characteristics, on a side of the bonding surface 104 to be bonded to the resin member 105.

The characteristics are represented by a mean width of the profile elements (RSm) and a maximum height roughness (Rz) and a surface 110 of the metal member 103 has at least a mean width of the profile elements (RSm) and a maximum height roughness (Rz) which are in ranges shown in (i) and (ii) described below. The mean width of the profile elements (RSm) and the maximum height roughness (Rz) are measured by a method based on JIS B 0633-2001.

(i) A mean width of the profile elements (RSm) is equal to or greater than 150 μm and equal to or smaller than 1500 μm and a maximum height roughness (Rz) is equal to or greater than 170 μm and equal to or smaller than 800 μm (ii) A mean width of the profile elements (RSm) is equal to or greater than 100 nm and equal to or smaller than 10000 nm and a maximum height roughness (Rz) is equal to or greater than 100 nm and equal to or smaller than 10000 nm Hereinafter, the ranges of (i) and (ii) as the characteristics of the concavo-convex shape and a method of forming the concavo-convex shape will be described.

<Characteristics (i)>

A concavo-convex shape having a mean width of the profile elements (RSm) which is equal to or greater than 150 μm and equal to or smaller than 1500 μm, preferably equal to or greater than 175 μm and equal to or smaller than 1300 μm, and more preferably equal to or greater than 600 μm and equal to or smaller than 1000 μm and a maximum height roughness (Rz) which is equal to or greater than 170 μm and equal to or smaller than 800 μm, preferably equal to or greater than 200 μm and equal to or smaller than 600 μm, and more preferably equal to or greater than 300 μm and equal to or smaller than 500 μm is formed on the metal member 103 configuring the metal/resin composite structure 106 according to the embodiment on the bonding surface 104 side to be bonded to the resin member 105.

As a method of forming the concavo-convex shape, a physical treatment, for example, a blast treatment or knurling is performed with respect to the surface 110 of the metal member 103, and a blast treatment is preferably performed.

Herein, as the blast treatment, there is a shot blast treatment of projecting a blast material using a centrifugal force of a bladed wheel which is called an impeller and an air blast treatment of projecting a blast material by compressed air using an air compressor, and both treatments can apply the specific concavo-convex shape to the surface 110 of the metal member 103. The adjustment of the mean width of the profile elements (RSm) and the maximum height roughness (Rz) can be achieved by adjusting a rotation rate of the impeller, in a case of the shot blast treatment, and can be achieved by adjusting injection pressure of compressed air, in a case of the air blast treatment.

In the air blast treatment, injection pressure of a blast material is higher than that in the shot blast treatment, and accordingly, it is possible to form a more uniform concavo-convex shape. Therefore, the air blast treatment is preferable as a method of the blast treatment.

Examples of the blast material include materials such as silica sand, alumina, aluminum-cut wires, steel grit, and steel shot, and each can be used according to each purpose. Regarding bonding with resins, silica sand is preferably used from viewpoints of a higher anchor effect, cost, and efficiency.

<Characteristics (ii)>

A concavo-convex shape having a mean width of the profile elements (RSm) which is equal to or greater than 100 nm and equal to or smaller than 10000 nm, preferably equal to or greater than 300 nm and equal to or smaller than 5000 nm, and more preferably equal to or greater than 600 nm and equal to or smaller than 1000 nm and a maximum height roughness (Rz) which is equal to or greater than 100 nm and equal to or smaller than 10000 nm, preferably equal to or greater than 150 nm and equal to or smaller than 400 nm, and more preferably equal to or greater than 200 nm and equal to or smaller than 300 nm is formed on the metal member 103 configuring the metal/resin composite structure 106 according to the embodiment on the bonding surface 104 side to be bonded to the resin member 105.

The concavo-convex shape may be further formed on the surface 110 where the concavo-convex shape having the mean width of the profile elements (RSm) and the maximum height roughness (Rz) shown in the characteristics (i) is formed.

As a method of forming the concavo-convex shape, a method such as a chemical etching method of dipping metal in an erosion aqueous solution or an erosion suspension or an anodic oxidation method is used. These methods can be selectively used depending on the kind of metal used for the metal member 103 or the concavo-convex shape to be formed in the ranges of the mean width of the profile elements (RSm) and the maximum height roughness (Rz). Among these methods, a chemical etching method of dipping metal in an aqueous solution of an inorganic base such as NaOH and/or an aqueous solution of an inorganic acid such as HCl or $HNO_3$ as an erosion agent is preferably used.

<Other Preferred Characteristics>

In the metal member 103 configuring the metal/resin composite structure 106 according to the embodiment on the bonding surface 104 side to be bonded to the resin member 105, ultrafine pores may be formed according to the method such as a method of dipping metal in an erosion aqueous solution or an erosion suspension or an anodic oxidation method which is performed when forming the concavo-convex shape having the mean width of the profile elements (RSm) and the maximum height roughness (Rz) according to the characteristics (ii), or ultrafine pores may be positively formed by dipping metal in an aqueous solution of one or more kinds selected from hydrazine hydrate, ammonia, and a water-soluble amine compound disclosed in Pamphlet of International Publication No. WO2009/31632, for example, after forming the concavo-convex shape having characteristics (ii).

A diameter of the ultrafine pores is equal to or greater than 5 nm and equal to or smaller than 100 nm, preferably equal to or greater than 10 nm and equal to or smaller than 70 nm, and more preferably equal to or greater than 15 nm and equal to or smaller than 50 nm. A depth of the hole is equal to or greater than 10 nm and equal to or smaller than 500 nm, preferably equal to or greater than 15 nm and equal to or smaller than 300 nm, and more preferably equal to or greater than 20 nm and equal to or smaller than 70 nm.

The diameter of the ultrafine pores and the depth of hole can be measured as follows.

First, regarding the diameter, the surface 110 of the metal member 103 is imaged using a scanning electron microscope (SEM). 50 ultrafine pores are arbitrary selected from the observation image and diameters thereof are measured. All diameters are added and divided by 50, and a result is set as the diameter of the ultrafine pores.

Next, regarding the depth of hole, a cross section of the vicinity of the surface of the metal member 103 is imaged using a transmission electron microscope (TEM). 10 portions for the depths of the hole formed by the ultrafine pores are arbitrarily selected and depths of the hole are measured. All depths of the hole are added and divided by 10 and a result is set as the depth of the hole of the ultrafine pores.

When the ultrafine pores are present on the surface 110 of the metal member 103, a resin composition configuring the resin member 105 which will be described later can enter the holes and a physical resisting power (anchor effect) is exhibited between the metal member 103 and the resin member 105, and accordingly, it is possible to expect improvement of bonding strength.

In the embodiment, a method of forming the concavo-convex shape having the characteristics (i) by performing the physical treatment such as the blast treatment with respect to the surface 110 of the metal member 103, forming the concavo-convex shape having the characteristics (ii) by performing the chemical etching method of dipping metal in an aqueous solution of an inorganic base and/or an aqueous solution of an inorganic acid, and forming a ultrafine concavo-convex shape using an aqueous solution containing one or more kinds selected from hydrazine hydrate, ammonia, and a water-soluble amine compound is preferably used.

[Preparing Method of Metal Member]

In the embodiment, a concavo-convex shape having two or more different types of characteristics which is formed in the metal member 103 on the bonding surface 104 side to be bonded to the resin member 105 can be formed by a method of applying respective characteristics (i) and (ii) described above. As described above, when forming the concavo-convex shape, first, the concavo-convex shape is formed by the method of applying the characteristics (i) and then, the concavo-convex shape is formed by the method of applying the characteristics (ii). If the methods of applying the characteristics (i) and (ii) are performed in the reversed order, the concavo-convex shape which is previously formed and is relatively fine may be broken by the latter process, and the desired shape may not be formed.

Accordingly, in the embodiment, as described above, the method of applying the characteristics (ii) is performed with respect to the metal member 103 after the method of applying the characteristics (i), and therefore, the relatively smaller concavo-convex shape is formed in the relatively large concavo-convex shape. Thus, when performing bonding with the resin member 105 which will be described later, a higher anchor effect is exhibited compared to technologies of the related art, and as a result, it is possible to increase bonding strength between the metal member 103 and the resin member 105.

It is preferable that the metal member 103 is subjected to the treatments performed by the methods described above, after working the metal in the predetermined shape described above by plastic working such as cutting or pressing or removing working such as punching, cutting, polishing, or electro-discharge machining. That is, metal which is worked in a necessary shape by various working methods is preferably used. Regarding the metal member 103 worked in a necessary shape, it is preferable that a surface to be bonded to the resin member 105 which will be described later is not oxidized or hydroxylated, and when it is clear that rust which is an oxidized coating film is present in the surface 110 which is left in a natural state for a long time, the rust is preferably removed by polishing or a chemical treatment.

A primer layer may be formed on the surface 110 of the metal member 103 subjected to the treatment performed by the method described above. In the embodiment, when the specific concavo-convex shape is formed in the surface 110 of the metal member 103 by the method described above, the bonding between the metal member 103 and the resin member 105 which will be described later is performed with high strength. However, when acquiring stronger bonding strength, a primer layer can be formed. Particularly, when the resin member 105 is formed of a resin composition containing a polyolefin resin, a primer layer is formed on the surface 110 of the metal member 103, and accordingly, it is possible to obtain the metal/resin composite structure 106 having higher bonding strength.

A material for configuring the primer layer is not particularly limited, and is generally formed of a primer resin material containing resin components. The primer resin material is not particularly limited and a well-known material can be used. Specifically, well-known polyolefin primer, epoxy primer, or urethane primer can be used. The forming method of the primer layer is not particularly limited, and the primer layer can be formed by applying a solution of the primer resin material or an emulsion of the primer resin material to the metal member 103 subjected to the surface treatment. As a solvent used when using a solution, toluene, methyl ethyl ketone (MEK), or dimethyl formamide (DMF) is used. As a medium for emulsion, an aliphatic hydrocarbon medium or water is used.

<Resin Member>

The resin member 105 configuring the metal/resin composite structure 106 according to the embodiment is formed of a resin composition containing a (A) thermoplastic resin and, if necessary, a (B) filling material. The resin composition further contains other compounding agents, if necessary. For convenience, even when the resin member 105 is formed of only the (A) thermoplastic resin, it is still stated that the resin member 105 is formed of a resin composition.

Hereinafter, the (A) thermoplastic resin, the (B) filling material, and other compounding agents will be described and a preparing method of the resin composition will be described.

[(A) Thermoplastic Resin]

Examples of the (A) thermoplastic resin as a raw material of the resin member 105 of the embodiment include a polyamide resin such as polyamide 6, polyamide 66, an aromatic polyamide resin; a polyolefin resin such as a polyethylene resin or a polypropylene resin; a polyester resin such as a polyethylene terephthalate resin or a polybutylene terephthalate resin; an amorphous resin such as an acrylonitrile-butadiene-styrene copolymer resin, a polycarbonate resin, or a polymethyl methacrylate resin; a polyphenylene sulfide resin, a polyphenylene ether resin, a polyether ether ketone resin, a polyimide resin, or a combination of two or more kinds thereof.

Among these, a polyamide resin, a polyolefin resin, an amorphous resin, a polyester resin, an acrylonitrile-butadiene-styrene copolymer resin, a polycarbonate resin, and a polyphenylene sulfide resin are preferably used. A polyamide resin, a polyolefin resin, a polyester resin, an acrylonitrile-butadiene-styrene copolymer resin, a polycarbonate resin, and a polyphenylene sulfide resin are more preferably used. Regarding a polyolefin resin, a polypropylene resin is preferably used. The (A) thermoplastic resins described above may be used alone or a combination of two or more kinds thereof may be used.

As the polyolefin resin, a polymer obtained by polymerizing olefin can be used without particular limitation.

As olefin configuring the polyolefin resin, ethylene, α-olefin, or cyclic olefin is used.

As the α-olefin, linear or branched α-olefin having 3 to 30 carbon atoms or preferably 3 to 20 carbon atoms is used. More specifically, examples thereof include propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene.

As the cyclic olefin, cyclic olefin having 3 to 30 carbon atoms is used and the number of carbon atoms is preferably 3 to 20. More specifically, examples thereof include cyclopentene, cycloheptene, norbornene, 5-methyl-2-norbornene, tetracyclododecene, 2-methyl-1,4,5,8-dimethano-1,2,3,4,4a,5,8,8a-octa tetrahydronaphthalene.

Preferable examples of olefin configuring the polyolefin resin include ethylene, propylene, 1-butene, 1-pentene, 3-methyl-1-butene, 1-hexene, 4-methyl-1-pentene, and 3-methyl-1-pentene. Among these, ethylene, propylene, 1-butene, 1-hexene, and 4-methyl-1-pentene are more preferably used and ethylene or propylene is even more preferably used.

The polyolefin resin may be obtained by polymerizing the olefin alone or may be obtained by combining two or more kinds with each other and performing a random copolymerization, a block copolymerization, or a graft copolymerization.

The polyolefin may have a linear or branched structure.

In the embodiment, when the resin member 105 is formed of the resin composition containing the (A) thermoplastic resin described above, the bonding with the metal member 103 is solidly performed. Particularly, among these, when the resin member 105 is formed of the resin composition containing a polyolefin resin, it was difficult to perform the bonding using a metal member after performing metal surface roughening treatment performed in the related art, but in the embodiment, the bonding strength with the metal member 103 is dramatically improved, even with the resin member 105 formed of the resin composition containing the polyolefin resin, and accordingly, a utility value in industries is extremely high. Therefore, it is preferable that a polyolefin resin is selected as the (A) thermoplastic resin.

A melt flow rate (MFR) or density of the (A) thermoplastic resin can be suitably selected and used depending on performance acquired for the metal/resin composite structure 106. For example, when using a polypropylene resin is used as the (A) thermoplastic resin, an MFR of a polypropylene resin measured under conditions of 230° C. and a load of 2.16 kg based on ASTM D1238 is preferably equal to or greater than 0.1 g/10 min and equal to or smaller than 800 g/10 min, more preferably equal to or greater than 0.5 g/10 min and equal to or smaller than 100 g/10 min, and even more preferably equal to or greater than 1.0 g/10 min and equal to or smaller than 20 g/10 min.

When using a polyamide resin such as polyamide 6 or polyamide 66 as the (A) thermoplastic resin, an MFR of the polyamide resin under conditions of 260° C. and a load of 2.16 kg is preferably equal to or greater than 1 g/10 min and equal to or smaller than 200 g/10 min, more preferably equal to or greater than 1 g/10 min and equal to or smaller than 150 g/10 min, and even more preferably equal to or greater than 1 g/10 min and equal to or smaller than 100 g/10 min.

[(B) Filling Material]

The resin composition configuring the resin member 105 of the embodiment may further contain the (B) filing material according to the necessary purpose, in addition to the (A) thermoplastic resin which is set as a compulsory component.

As the (B) filing material, one kind or two or more kinds can be selected from a group consisting of glass fibers, carbon fibers, carbon particles, clay, talc, silica, minerals, and cellulose fibers, for example. Among these, one kind or two or more kinds are preferably selected from glass fibers, carbon fibers, talc, and minerals.

The shape of the (B) filing material may be any shape such as a fibrous shape, a particle shape or a plate shape.

When the resin composition contains the (B) filing material, the content thereof is preferably equal to or greater than 1 part by mass and equal to or smaller than 100 parts by mass, more preferably equal to or greater than 5 parts by mass and equal to or smaller than 90 parts by mass, and particularly preferably equal to or greater than 10 parts by mass and equal to or smaller than 80 parts by mass, with respect to 100 parts by mass of the (A) thermoplastic resin.

The (B) filing material causes an effect of decreasing and controlling a coefficient of linear expansion of the resin member 105, in addition to an effect of increasing rigidity of the resin member 105. Particularly, in a case of a composite of the metal member 103 and the resin member 105 of the embodiment, a temperature dependability of a shape stability of each of the metal member 103 and the resin member 105 is largely different from each other in many cases, and accordingly, the composite may be distorted when a great change occurs in temperature. This distortion can be decreased when the resin member 105 contains the (B) filing material. In addition, it is possible to prevent a decrease in toughness by setting the content of the (B) filing material in the range described above.

[Other Compounding Agents]

In the embodiment, compounding agents may be contained in the resin member 105 for applying each function.

Examples of the compounding agents include a thermal stabilizer, an antioxidant, a pigment, a weathering agent, a flame retardant, a plasticizer, a dispersing agent, a lubricant, a release agent, and an antistatic agent.

[Preparation of Resin Composition]

The resin composition can be obtained by mixing or melting and mixing the (A) thermoplastic resin, and if necessary (B) filling material and other compounding agents using a mixing device such as a Banbury mixer, a single screw extruder, a twin-screw extruder, or a high-speed twin-screw extruder.

<Metal/Resin Composite Structure>

The metal/resin composite structure 106 according to the embodiment is configured with the metal member 103 and the resin member 105.

More specifically, the resin composition configuring the resin member 105 enters the specific concavo-convex shape portion having two or more different types of characteristics which is formed in the surface 110 of the metal member 103, the metal and the resin are bonded to each other, and a metal-resin interface is formed, and accordingly, the metal/resin composite structure 106 of the embodiment is obtained.

In the embodiment, it is not clear why high bonding strength with the resin member 105 is exhibited by forming the specific concavo-convex shape having two or more different types of characteristics described above in the surface 110 of the metal member 103, but the reason may be that the concavo-convex shape and the ultrafine holes exhibit a vent effect based on the characteristics (ii) and air releasing occurs. That is, it is assumed that, in a case of only the concavo-convex shape based on the characteristics (i), when the resin composition configuring the resin member is attempted to be bonded to the metal member based on a manufacturing method of the metal/resin composite structure which will be described later, the resin composition hardly enters deep portions of the concave portions due to the presence of an air layer between the metal member and the resin member. However, by combining the concavo-convex shape and the ultrafine pores based on the characteristics (ii) with the concavo-convex shape based on the characteristics (i), air enters the concavo-convex shape and the ultrafine pores based on the characteristics (ii) and the resin composition can enter deep portions of the concave portions based on the characteristics (i). With such a circumference, the metal member 103 and the resin member 105 may exhibit high bonding strength by applying the characteristics (i) and (ii) to the surface 110 of the metal member 103.

<Manufacturing Method of Metal/Resin Composite Structure>

A manufacturing method of the metal/resin composite structure 106 of the embodiment is not particularly limited, and the metal/resin composite structure is obtained by bonding the resin composition to the metal member 103 having the characteristics described above while molding the resin composition so as to have a desired shape of the resin member 105.

As a molding method of the resin member 105, a resin molding method such as injection molding, extrusion molding, heat press molding, compression molding, transfer molding, cast molding, laser welding molding, reaction injection molding (RIM molding), LIM molding, spray forming, or the like.

Among these, injection molding is preferable, and specifically, it is preferable that the metal member 103 is inserted into a cavity portion of an injection molding die and the resin member is manufactured by an injection molding method of injecting the resin composition to the die. Specifically, the method includes the following steps (1) to (3).

(1) A step of preparing the resin composition (2) A step of installing the metal member 103 in a die for injection molding (3) A step of performing injection molding of the resin composition in the die so that the resin composition comes into contact with at least a part of the metal member 103

Hereinafter, each step will be described.

As described above, in the (1) step of preparing the resin composition, the resin composition can be obtained by mixing or melting and mixing the (A) thermoplastic resin, and if necessary (B) filling material and other compounding agents using a mixing device such as a Banburymixer, a single screw extruder, a twin-screw extruder, or a high-speed twin-screw extruder.

Next, an injection molding method performed by steps (2) and (3) will be described.

First, a die for injection molding is prepared, the die is opened, and the metal member 103 is installed in a part of the die.

Next, the die is closed, the resin composition obtained in the step (1) is injected into the die and solidified so that at least a part of the resin composition comes into contact with the surface where the concave shape of the metal member 103 is formed. After that, the die is opened and separated, and accordingly, the metal/resin composite structure 106 can be obtained.

The injection molding performed by the steps (1) to (3) described above and injection foaming molding or rapid heat cycle molding (RHCM, heating and cooling molding) of rapidly heating and cooling the die may be used in combination.

As a method of the injection foaming molding, a method of adding a chemical foaming agent to the resin, a method of directly injecting nitrogen gas or carbon dioxide gas to a cylinder part of an injection molding device, or a MuCell injection foaming molding method of injecting nitrogen gas or carbon dioxide gas to a cylinder part of an injection molding device in a supercritical state is used.

It is possible to obtain the metal/resin composite structure 106 in which the resin member 105 is a foam body by any method. With any method, counter pressure can be used or core back can be used depending on a shape of a molded product as a controlling method of the die.

The rapid heat cycle molding can be performed by connecting a rapid heating and cooling device to a die. The rapid heating and cooling device may use a generally used system. A heating method may be any one method or a combination of a plurality of methods from a steam method, a pressurized hot water method, a hot water method, a heat oil method, an electric heater method, and an electromagnetic induction heating type.

A cooling method may be any one method or a combination of a cold water method and a cold oil method. It is desired that the injection molding die is heated to a temperature equal to or higher than 100° C. and equal to or lower than 250° C., and the injection molding die is cooled after completing injection of the resin composition, for example, as conditions of the rapid heat cycle molding method. A temperature for heating the die has different preferred ranges depending on the (A) thermoplastic resin configuring the resin composition, and when the (A) thermoplastic resin is a crystalline resin and a resin having a melting point lower than 200° C., the temperature thereof is preferably equal to or higher than 100° C. and equal to or lower than 150° C., and when the (A) thermoplastic resin is a crystalline resin and a resin having a melting point equal to or higher than 200° C., the temperature thereof is preferably equal to or higher than 140° C. and equal to or lower than 250° C. When the (A) thermoplastic resin is an amorphous resin, the temperature thereof is desirably equal to or higher than 100° C. and equal to or lower than 180° C.

<Purpose of Metal/Resin Composite Structure>

The metal/resin composite structure 106 of the embodiment has high productivity and a high degree of freedom of shape controlling, and accordingly, the metal/resin composite structure can be used for various purposes.

Examples thereof include structural components for a car, car-mounted components, a housing of an electronic device, a housing of household electric appliances, structural components, mechanical components, various automobile components, components for an electronic device, the purpose for household goods such as furniture, or kitchenware, medical equipment, components of construction materials, other structural components or exterior components.

More specifically, examples thereof include the following components which are designed so that a portion having insufficient strength just with the resin is supported by the metal. In vehicles, an instrument panel, a console box, door knobs, door trim, a shift lever, pedals, a glove box, a bumper, a hood, fenders, a trunk, doors, a roof, a pillar, seats, a radiator, an oil pan, a steering wheel, an ECU box, and electrical parts are used. In construction or household goods, glass window frames, handrails, curtain rail, a chest of drawers, and drawer, closet, a bookshelf, a desk, and a chair are used. A connector, a relay, and gears are used as precise electronic components. A transport container, a suitcase, and a trunk are used as transportation containers.

Various consumer electronics can also be used. Household appliances such as a refrigerator, a washing machine, a vacuum cleaner, a microwave oven, an air conditioner, lighting equipment, an electric kettle, a TV, a clock, a ventilating fan, a projector, and speakers, and electronic information devices such as a computer, a mobile phone, a smart phone, a digital camera, a tablet PC, a portable music player, a portable game machine, a charger, and a battery are used.

For other uses, toys, sports equipment, shoes, sandals, bags, tableware such as forks, knifes, spoons, and dishes, stationery such as a ball pen or a mechanical pencil, a file, and a binder, cookware such as a pan or a pot, a kettle, a spatula, a ladle, a perforated ladle, a whisk, and a tong, components for lithium ion secondary battery, and a robot are used.

Hereinabove, the usage of the metal/resin composite structure 106 of the invention has been described, but these are examples of the use application of the invention and various other configurations can be used.

Hereinabove, the embodiments of the invention has been described, but these are merely examples of the invention and various other configurations can be used.

EXAMPLES

Hereinafter, the embodiments of the invention will be described with reference to Examples but the embodiment is not limited thereto.

Figure 2:
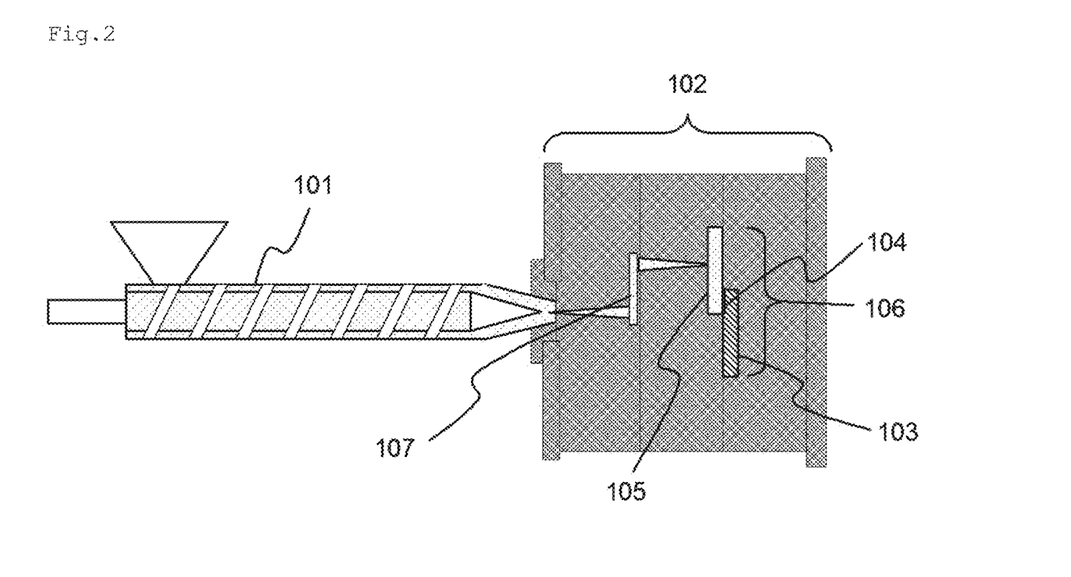
FIG. 2 is a configuration diagram schematically showing an example of a process of manufacturing the metal/resin composite structure according to the embodiment.

FIGS. 1 and 2 are used as common diagrams of each example.

FIG. 1 is an outline view schematically showing an example of a structure of the metal/resin composite structure 106 including the metal member 103 and the resin member 105.

FIG. 2 is a configuration diagram schematically showing an example of a process of manufacturing the metal/resin composite structure 106 including the metal member 103 and the resin member 105. Specifically, the drawing schematically shows a process of installing the metal member 103 which is worked in a predetermined shape and includes the surface 110 where a surface treatment area (bonding surface 104) having a fine concavo-convex surface is formed, in a die 102 for injection molding, injecting the resin composition by an injection molding device 101 through a gate/runner 107, and manufacturing the metal/resin composite structure 106 which is integrated with the metal member 103 in which the fine concavo-convex surface is formed.

(Metal Surface Analysis)

The mean width of the profile elements (RSm) and the maximum height roughness (Rz) of the characteristics (i) were measured by a laser microscope (VK-X100 manufactured by KEYENCE).

In addition, the mean width of the profile elements (RSm) and the maximum height roughness (Rz) of the characteristics (ii) were measured by a scanning probe microscope (SPM-9700 manufactured by Shimadzu Corporation).

(Evaluation Method and Determination of Bonding Strength)

The measurement was performed using a tensile strength tester "model 1323 (manufactured by Aikoh Engineering Co., Ltd.)" and attaching a dedicated jig to the tensile strength tester, under conditions of room temperature (23° C.), a distance between chucks of 60 mm, and a tensile rate of 10 mm/min. A breaking weight (N) was divided by an area of the metal/resin bonded portion to obtain bonding strength (MPa).

Surface Treatment of Metal

Preparation Example 1

A commercially available A5052 aluminum alloy plate having a thickness of 1.6 mm was cut into a rectangular piece having a size of 18 mm×45 mm, and a concavo-convex shape having Rsm of 900 μm and Rz of 400 μm was prepared on the plate surface by an air nozzle type blast treatment using silica sand (No. 5 A manufactured by Ube Sand Industries, Ltd.) and an air blast device (injection pressure of compressed air: 5.25 kg/cm$^2$) which is ACR-1 manufactured by ATSUCHI TEKKO CO., LTD. Next, the surface treatment was performed based on a method of an experimental example 1 disclosed in Pamphlet of International Publication No. WO2009/31632 and a metal member was obtained.

Figure 3:
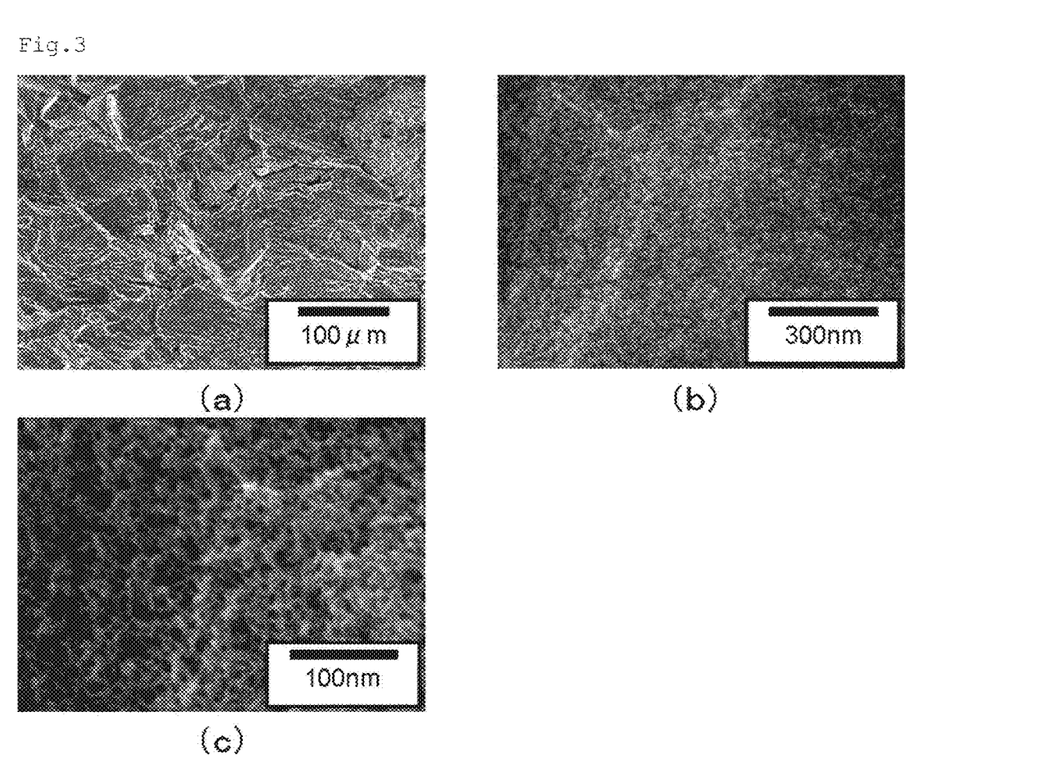
FIG. 3 is a diagram showing electron microscope images ((a) shows 250 magnifications, (b) shows 100000 magnifications, and (c) shows 300000 magnifications) of a surface of a metal member manufactured in Preparation Example 1.

When observing the metal member using a scanning type probe microscope (SPM-9700 manufactured by Shimadzu Corporation) with a field of vision of 4 μm, a concavo-convex shape having RSm of 800 nm and RZ of 240 nm was formed in the concavo-convex surface which is formed by the blast treatment. In addition, when observing the metal member using a scanning electron microscope (JSM-6701F manufactured by JEOL) with 300000 magnifications, ultra-fine pores having a depth of approximately 20 nm were formed on the surface of the metal member. The images are shown in FIG. 3.

Preparation Example 2

A commercially available A5052 aluminum alloy plate having a thickness of 1.6 mm was cut into a rectangular piece having a size of 18 mm×45 mm, and a concavo-convex shape having Rsm of 200 µm and Rz of 250 µm was prepared on the plate surface by an air nozzle type blast treatment using silica sand (No. 5 A manufactured by Ube Sand Industries, Ltd.) and an air blast device (injection pressure of compressed air: 3.25 kg/cm$^2$) which is ACR-1 manufactured by ATSUCHI TEKKO CO., LTD. Next, the surface treatment was performed based on a method of an experimental example 1 disclosed in Pamphlet of International Publication No. WO2009/31632 and a metal member was obtained.

When observing the metal member using a scanning type probe microscope (SPM-9700 manufactured by Shimadzu Corporation) with a field of vision of 4 µm, a concavo-convex shape having RSm of 800 nm and RZ of 240 nm was formed in the concavo-convex surface which is formed by the blast treatment. In addition, when observing the metal member using a scanning electron microscope (JSM-6701F manufactured by JEOL) with 300000 magnifications, ultrafine pores having a depth of approximately 20 nm were formed on the surface of the metal member.

Preparation Example 3

A commercially available A5052 aluminum alloy plate having a thickness of 1.6 mm was cut into a rectangular piece having a size of 18 mm×45 mm, and a concavo-convex shape having Rsm of 900 µm and Rz of 400 µm was prepared on the plate surface by an air nozzle type blast treatment using silica sand (No. 5 A manufactured by Ube Sand Industries, Ltd.) and an air blast device (injection pressure of compressed air: 5.25 kg/cm$^2$) which is ACR-1 manufactured by ATSUCHI TEKKO CO., LTD. Next, the surface treatment was performed by partially changing (without performing dipping in an aqueous hydrazine solution) a method of an experimental example 1 disclosed in Pamphlet of International Publication No. WO2009/31632 and a metal member was obtained.

When observing the metal member using a scanning type probe microscope (SPM-9700 manufactured by Shimadzu Corporation) with a field of vision of 4 µm, a concavo-convex shape having RSm of 800 nm and RZ of 240 nm was formed in the concavo-convex surface which is formed by the blast treatment. In addition, the metal member was observed using a scanning electron microscope (JSM-6701F manufactured by JEOL) with 300000 magnifications and ultrafine pores observed in Preparation Example 1 were not observed.

Preparation Example 4

A commercially available A5052 aluminum alloy plate having a thickness of 1.6 mm was cut into a rectangular piece having a size of 18 mm×45 mm, a concavo-convex shape having Rsm of 900 µm and Rz of 400 µm was prepared on the plate surface by an air nozzle type blast treatment using silica sand (No. 5 A manufactured by Ube Sand Industries, Ltd.) and an air blast device (injection pressure of compressed air: 5.25 kg/cm$^2$) which is ACR-1 manufactured by ATSUCHI TEKKO CO., LTD, and a metal member was obtained.

Figure 4:
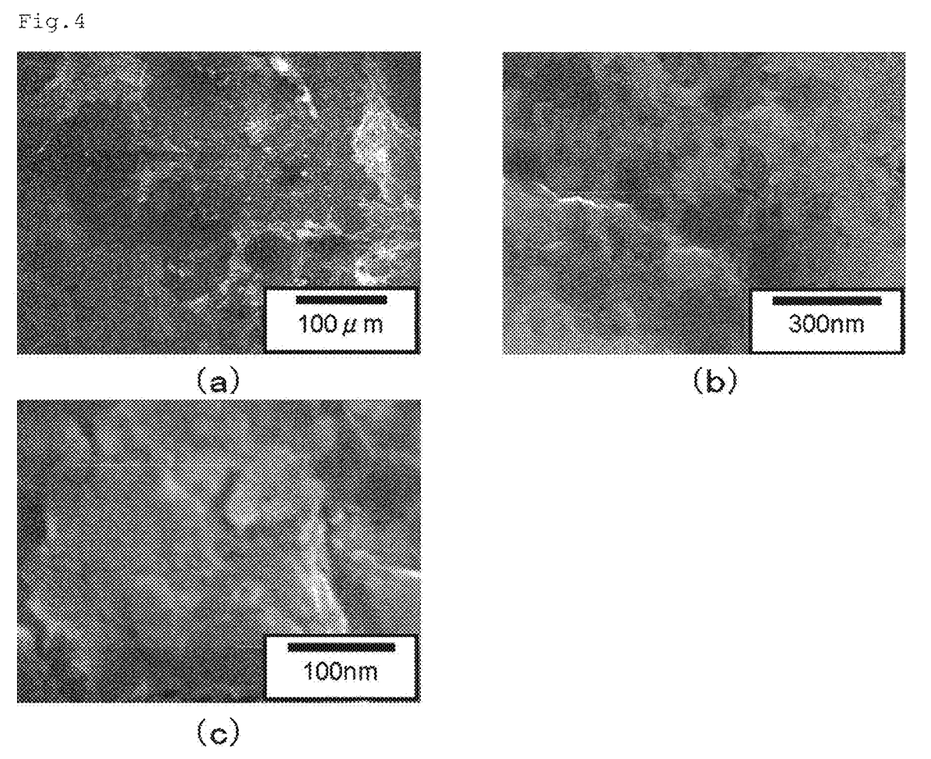
FIG. 4 is a diagram showing electron microscope images ((a) shows 250 magnifications, (b) shows 100000 magnifications, and (c) shows 300000 magnifications) of a surface of a metal member manufactured in Preparation Example 4.

The metal member was observed using a scanning electron microscope (JSM-6701F manufactured by JEOL) with 300000 magnifications, but the concavo-convex shape and the ultrafine pores observed in Preparation Example 1 were not observed. The images are shown in FIG. 4.

Preparation Example 5

A commercially available A5052 aluminum alloy plate having a thickness of 1.6 mm was cut into a rectangular piece having a size of 18 mm×45 mm, the surface treatment was performed based on a method of an experimental example 1 disclosed in Pamphlet of International Publication No. WO2009/31632, without performing the blast treatment, and a metal member was obtained.

Figure 5:
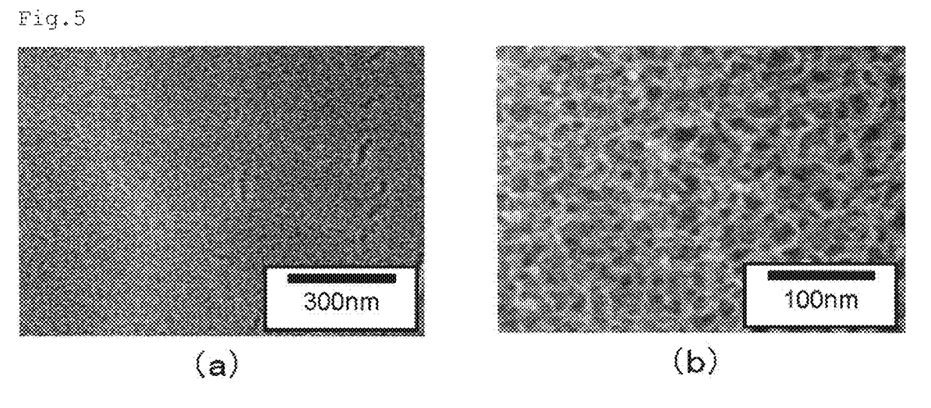
FIG. 5 is a diagram showing electron microscope images ((a) shows 100000 magnifications and (b) shows 300000 magnifications) of a surface of a metal member manufactured in Preparation Example 5.

When observing the metal member using a scanning type probe microscope (SPM-9700 manufactured by Shimadzu Corporation) with a field of vision of 4 µm, a concavo-convex shape having RSm of 800 nm and RZ of 240 nm was formed. In addition, when observing the metal member using a scanning electron microscope (JSM-6701F manufactured by JEOL) with 300000 magnifications, ultrafine pores having a depth of approximately 20 nm were formed in the concavo-convex surface. The images are shown in FIG. 5.

Preparation Example 6

A commercially available A5052 aluminum alloy plate having a thickness of 1.6 mm was cut into a rectangular piece having a size of 18 mm×45 mm, and a concavo-convex shape having Rsm of 120 µm and Rz of 150 µm was prepared on the plate surface by an air nozzle type blast treatment using silica sand (No. 6 A manufactured by Ube Sand Industries, Ltd.) and an air blast device (injection pressure of compressed air: 3.25 kg/cm$^2$) which is ACR-1 manufactured by ATSUCHI TEKKO CO., LTD. Next, the surface treatment was performed based on a method of an experimental example 1 disclosed in Pamphlet of International Publication No. WO2009/31632 and a metal member was obtained.

When observing the metal member using a scanning type probe microscope (SPM-9700 manufactured by Shimadzu Corporation) with a field of vision of 4 µm, a concavo-convex shape having RSm of 800 nm and RZ of 240 nm was formed in the concavo-convex surface which is formed by the blast treatment. In addition, when observing the metal member using a scanning electron microscope (JSM-6701F manufactured by JEOL) with 300000 magnifications, ultrafine pores having a depth of approximately 20 nm were formed in the concavo-convex surface.

Example 1

A small dumbbell metal insert die 102 was mounted on JSW J85AD manufactured by the Japan Steel Works, LTD. and the aluminum piece (metal member 103) prepared in Preparation Example 1 was installed in the die 102. Then, the injection molding of glass fiber-reinforced polypropylene (80 parts by weight of V7100 manufactured by Prime Polymer Co., Ltd., polypropylene (MFR (230° C. load of 2.16 kg): 18 g/10 min) and 20 parts by weight of glass fiber), as the resin composition, was performed in the die 102 under conditions of a cylinder temperature of 250° C., a die temperature of 120° C., an injection rate of 25 mm/sec, holding pressure of 80 MPa, and holding time of 10 seconds, and a metal/resin composite structure was obtained. An evaluation result of bonding strength is shown in Table 1.

Example 2

A metal/resin composite structure was obtained by the same method as in Example 1, except for changing the aluminum piece used to a piece prepared in Preparation Example 2. An evaluation result of bonding strength is shown in Table 1.

Example 3

A metal/resin composite structure was obtained by the same method as in Example 1, except for changing the aluminum piece used to a piece prepared in Preparation Example 3. An evaluation result of bonding strength is shown in Table 1.

Comparative Example 1

A metal/resin composite structure was obtained by the same method as in Example 1, except for changing the aluminum piece used to a piece prepared in Preparation Example 4. An evaluation result of bonding strength is shown in Table 1.

Comparative Example 2

A metal/resin composite structure was obtained by the same method as in Example 1, except for changing the aluminum piece used to a piece prepared in Preparation Example 5.

An evaluation result of bonding strength is shown in Table 1.

Comparative Example 3

A metal/resin composite structure was obtained by the same method as in Example 1, except for changing the aluminum piece used to a piece prepared in Preparation Example 6. An evaluation result of bonding strength is shown in Table 1.

TABLE 1

| | | | | Ex. 1 | Ex. 2 | Ex. 3 | Com. Ex. 1 | Com. Ex. 2 | Com. Ex. 3 |
|---|---|---|---|---|---|---|---|---|---|
| <Metal member> | Preparing method | | | Preparation Ex. 1 | Preparation Ex. 2 | Preparation Ex. 3 | Preparation Ex. 4 | Preparation Ex. 5 | Preparation Ex. 6 |
| | Characteristics (i) | RSm | μm | 900 | 200 | 900 | 900 | — | 120 |
| | | Rz | μm | 400 | 250 | 400 | 400 | — | 150 |
| | Characteristics (ii) | RSm | nm | 800 | 800 | 800 | — | 800 | 800 |
| | | Rz | nm | 240 | 240 | 240 | — | 240 | 240 |
| | Presence or absence of ultrafine concavities and convexities | — | | Observed | Observed | None | None | Observed | Observed |
| <Evaluation> | Bonding strength | | MPa | 18 | 13 | 14 | 9 | 0 | 10 |

RSm: mean width of the profile elements
Rz: maximum height roughness

Figure 6:
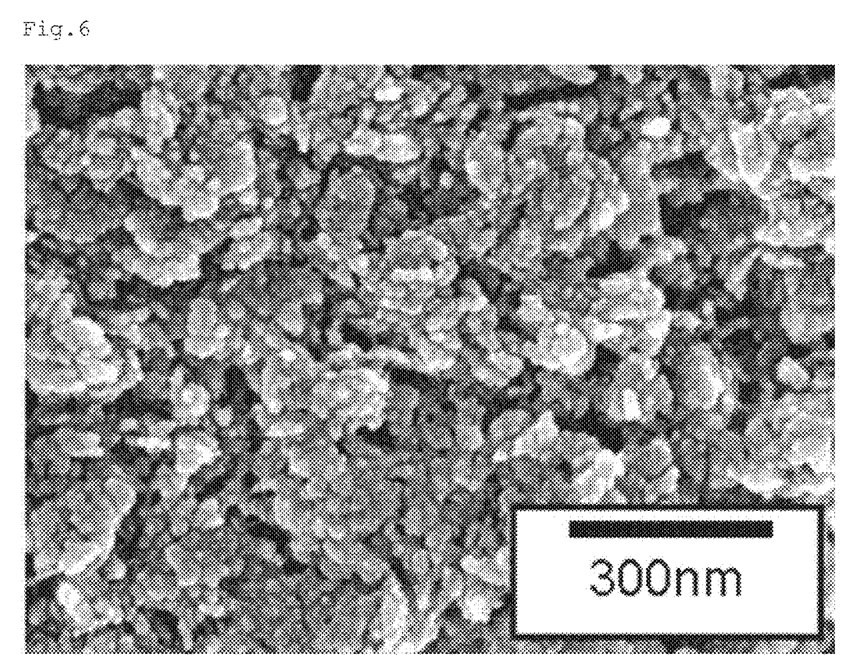
FIG. 6 is a diagram showing an electron microscope image (100000 magnifications) of a bonding surface resin side of a metal/resin composite structure manufactured in Example 1.

The aluminum piece used in Example 1 satisfied RSm and Rz set by the blast treatment performed for the characteristics (i) and RSm and Rz set by the etching performed for the characteristics (ii) in the ranges described above, and ultrafine concavities and convexities formed in the concavo-convex surface were present, and accordingly, the aluminum piece having extremely high bonding strength with the resin member was obtained. When a metal side of the metal/resin composite structure was dissolved in 5% of a nitric acid aqueous solution and a surface structure of a resin side was observed using a scanning electron microscope (JSM-6701F manufactured by JEOL) with 100000 magnifications, ultrafine convex shape having a height of approximately 20 nm was observed and it was found that the resin member entered the ultrafine pores formed in the surface of the metal member. The image is shown in FIG. 6.

Meanwhile, in Comparative Example 1, the aluminum piece has RSm of 900 μm and Rz of 400 μm set by the blast treatment performed for the characteristics (i) and satisfies the ranges described above, but the etching for applying the characteristics (ii) is not performed, and accordingly, the features of the invention are not satisfied.

In Comparative Example 2, the aluminum piece has RSm of 800 nm and Rz of 240 nm set by the etching performed for the characteristics (ii) and satisfies the ranges described above, and ultrafine concavities and convexities formed in the concavo-convex surface were present, but the blast treatment for applying the characteristics (i) is not performed, and accordingly, the features of the invention are not satisfied.

Figure 7:
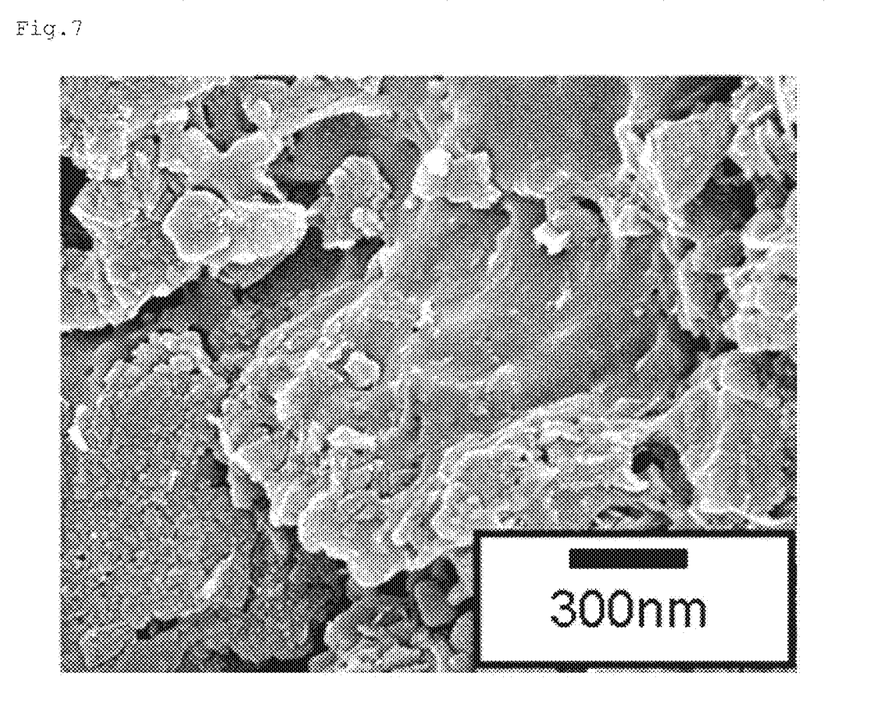
FIG. 7 is a diagram showing an electron microscope image (100000 magnifications) of a bonding surface resin side of a metal/resin composite structure manufactured in Comparative Example 1.

A metal side of the metal/resin composite structure of Comparative Example 1 was dissolved in 5% of a nitric acid aqueous solution and a surface structure of a resin side was observed using a scanning electron microscope (JSM-6701F manufactured by JEOL) with 100000 magnifications. However, the ultrafine convex shape in the order of nanometer was not observed. The image is shown in FIG. 7.

In Comparative Example 2, the metal member and the resin member are separated from each other immediately after injection monolithic molding, and accordingly, the observation of the surface structure of the resin side of the metal/resin composite structure was not performed. However, it is considered that the resin member does not enter the ultrafine pores formed on the surface of the metal member. Accordingly, in Comparative Examples 1 and 2, bonding strength with the resin member is also low.

In Comparative Example 3, it is attempted to increase a bonding area with the resin member by forming the concavo-convex shape which is differently ordered to be formed on the surface of the metal member in order to improve the bonding strength with the resin member, but desired effects were not obtained. The reason thereof is because RSm and Rz set by the blast treatment and the features of the invention are not satisfied.

Priority is claimed on Japanese Patent Application No. 2013-190607, filed Sep. 13, 2013, the entire content of which is incorporated herein by reference.

The invention claimed is:
1. A metal/resin composite structure, comprising
a metal member and a resin member, the metal member being in direct contact with the resin member, and the metal member having a bonding surface to be bonded to the resin member,
the bonding surface having a first concavo-convex shape having a first set of profile elements satisfying the following characteristics (i) and a second concavo- convex shape having a second set of profile elements satisfying the following characteristics (ii), (i) a mean width of the first set of profile elements (RSm) is equal to or greater than 600 μm and equal to or smaller than 1300 μm and a maximum height roughness (Rz) is equal to or greater than 200 μm and equal to or smaller than 600 μm, (ii) a mean width of the second set of profile elements (RSm) is equal to or greater than 600 nm and equal to or smaller than 1000 nm and a maximum height roughness (Rz) is equal to or greater than 150 nm and equal to or smaller than 400 nm, wherein the second concavo-convex shape having the second set of profile elements is located in the first concavo-convex shape having the first set of profile elements, wherein the metal member is selected from a group consisting of an aluminum member and an aluminum alloy member containing aluminum as a main component, wherein the resin member is formed of a resin composition containing an (A) thermoplastic resin, wherein the (A) thermoplastic resin is a polyolefin resin, wherein the resin member is a thermoplastic injection molded body, and wherein an ultrafine concavo-convex shape having a diameter equal to or greater than 5 nm and equal to or smaller than 100 nm and a depth equal to or greater than 10 nm and equal to or smaller than 500 nm is formed on the surface of the metal member.

2. The metal/resin composite structure according to claim 1, wherein the resin composition contains a (B) filling material and the content of the (B) filling material is equal to or greater than 1 part by mass and equal to or smaller than 100 parts by mass with respect to 100 parts by mass of the (A) thermoplastic resin.

3. A manufacturing method of the metal/resin composite structure according to claim 1, comprising:

forming the first set of profile elements satisfying the characteristics (i) on the surface of the metal member by performing a blast treatment with respect to the metal member, and then forming the second set of profile elements satisfying the characteristics (ii) on the surface of the metal member by performing a chemical etching method of dipping the metal member in at least one kind of an aqueous solution selected from an aqueous solution of an inorganic base and an aqueous solution of an inorganic acid, and forming the ultrafine concavo-convex shape on the surface of the metal member by dipping the metal member in an aqueous solution containing one or more kinds selected from hydrazine hydrate, ammonia, and a water-soluble amine compound.

* * * * *